United States Patent [19]

Boze et al.

[11] Patent Number: 4,704,210

[45] Date of Patent: Nov. 3, 1987

[54] PROCESS AND APPARATUS FOR FILTERING FLUIDS

[75] Inventors: Ronald A. Boze, Covington, La.; Theodore A. Warning, Houston, Tex.

[73] Assignee: L'eau Claire Systems, Inc., Kenner, La.

[21] Appl. No.: 843,996

[22] Filed: Mar. 25, 1986

[51] Int. Cl.$^4$ .............................................. B01D 37/02
[52] U.S. Cl. .................................... 210/778; 210/799; 210/804; 210/193; 210/265; 210/323.2; 210/497.1
[58] Field of Search ................ 210/777, 778, 794–798, 210/799, 807, 193, 274–276, 323.2, 409–412, 486, 497.1, 804, 265

[56] References Cited

U.S. PATENT DOCUMENTS

| | | | |
|---|---|---|---|
| 4,451,377 | 5/1984 | Luxemburg | 210/778 |
| 4,560,483 | 12/1985 | Warning et al. | 210/777 |

Primary Examiner—Ivars Cintins
Attorney, Agent, or Firm—Keaty & Keaty

[57] ABSTRACT

Apparatus is provided to allow a relatively high pressure differential to build up across the filter element and layer of filter media in a filter aid filtration vessel.

A process and apparatus are provided for reusing filter media in a filter aid filtration system.

A process and apparatus are provided for drying filter cake in a filtration vessel to facilitate its disposal. Pressurized gas is used to assist in blowing the filter cake off of the filter elements.

A process and apparatus are provided for draining the heel of a filter aid filtration vessel as filtrate.

37 Claims, 11 Drawing Figures

PROCESS AND APPARATUS FOR FILTERING FLUIDS

BACKGROUND OF THE INVENTION

1. Field of the Invention

The apparatus and process of the present invention relate to filtration of fluids. More particularly, the apparatus and process of the present invention relate to filtering of suspended contaminants in a fluid utilizing pre-coat filtration.

2. General Background of the Invention

When producing oil wells, it is common practice to pump water downhole in order to force the oil out of a formation. When producing as well offshore, it is common practice to pump seawater downhole for this purpose. Organisms in the seawater, however, tend to plug pores in the formation such that, after some time, it becomes impossible to pump any more water into the formation, and consequently impossible to pump any more oil out of the formation.

To overcome this problem, various filtration methods have been used to filter the seawater before pumping it downhole. One method is the use of sand filters. While sand filters are effective at filtering out the organisms, water moves slowly through them. Consequently, a large number of large sand filters are needed to provide enough water for a typical offshore well.

In another filtration method, fluids are filtered through a layer of filter media, which normally comprises diatomaceous earth or perlite. The layer of filter media is normally formed on the upstream side of a filter element in a filtration tank. This process is commonly known as pre-coat filtration. As the suspended contaminants saturate the filter media layer, a pressure differential across the filter media layer and the filter element builds up. The filter elements generally comprise a layer of cloth or screen to prevent the filter media from migrating through the filter element; the maximum value of the pressure differential which can build up across the filter media layer and the filter element is limited by the strength of the screen or cloth to maintain the integrity of the opening size therein. If the pressure differential rises above the maximum value, filter media passes through the filter element with the filtrate, impairing the quality of filtrate. When a predetermined pressure differential is reached, the filter elements are cleaned. Cleaning is typically achieved by back-washing or sluicing the filter media layer from the filter elements, during which time the filter media and the contaminants are discarded. This method requires a new supply of virgin filter media for each filtration cycle. The relatively large amounts of filter media used in this practice generally result in it not being economically feasible and/or operationally practical to utilize pre-coat filtration, due to initial costs, storage problems and disposal costs. The mixture of used filter media and fluid is relatively heavy and bulky to store until it can be properly disposed of (regulations of most countries prohibit dumping of the material into the sea).

There are known processes for what is known as dry cake discharge. This refers to a method of drying the layer of filter media before removing it from the filtration vessel, which makes it lighter and therefore easier to dispose of. All such processes known to applicant require scrapers or vibrators to free cake from the filter elements. The scrapers and vibrators are very costly to maintain, tend to cause mechanical damage to the filter elements, and even when properly maintained do not remove the cake completely.

Often, when time is more important than economy of materials, a method known as body feed filtration can be used. In body feed, a pre-coat layer is formed on the filter elements. Fulid to be filtered enters the vessel and exits through the filter elements. Filter media is continuously added to the filter from a slurry tank before the fluid enters the filtration vessel. The rate of flow of the filter media into the fluid is controlled such that the layer of filter media does not become clogged by the contaminants, but rather the contaminants are spaced enough apart in the layer of filter media that flow through the filter media is still possible. Filtration continues until such time as the layer of filter media is either so thick that fluid cannot easily pass through it, or adjacent layers of filter media are near the point they would come into contact. At that time, the filter media is discharged from the vessel. Although this method can prolong the time interval between cleaning filter elements, it uses even more filter media than standard pre-coat filtration; consequently there are higher initial costs, storage problems, and higher disposal costs for the filter media used in this method.

Attempts to allow the pressure differential across the filter media layer and the filter element to increase while still providing high quality filtrate have also been made (because the pressure differential continually increases during filtering process, a filtration system which can withstand a higher pressure differential across the filter media layer and the filter element will need to be cleaned less often, and consequently will produce less waste filter media to filter a given amount of water). One such attempt includes using, as the filter element, a perforated cylindrical support core and windings of strand material across the support core. This method is disadvantageous in that the filter media often becomes trapped in the strands, making cleaning of the filter elements difficult.

In chemical and food processing plants, a given filtration system may be used at different times to filter different products. Usually, one batch of product would ideally be processed in its entirety, before the next batch of a different product is processed in the same filtration vessel. With current techniques, when it is time to filter a different product in the filtration vessel, the fluid which remains in the filtration vessel is removed through a valve in the lower portion of the vessel, without passing through the filter elements. This portion of the product batch would have to be disposed of (lost) or stored until the next batch of that same product is processed. The nature of the product may not permit storage or, when many different products are processed, may require a large and costly storage facility.

Filtration methods utilizing pre-coat filtration and pre-coat filtration in conjunction with body feed are known collectively as filter aid filtration. Additional information on filter aid filtration methods can be found in U.S. Pat. Nos. 4,388,197 and 4,560,483.

SUMMARY OF THE INVENTION

The present invention is a filtration system which can filter a given amount of seawater in about 1/10 of the space which would be needed using typical sand filters.

The present invention provides apparatus, for use with pre-coat filtration, which is able to withstand a relatively high pressure differential across the filter element and layer of filter media, which provides high quality filtrate, and which has a filter element which is easy to clean.

The present invention also provides a process and apparatus for allowing filter media to be used more than once in filter aid filtration to filter fluid in a system.

The present invention also provides a process and apparatus for drying filter media which has been used in pre-coat filtration, to facilitate disposal thereof.

The present invention also provides a process and apparatus for dehydrating material which is suspended in a fluid.

In a filter aid filtration vessel, a conduit which has high resistance to deformation of the opening size therein is used as the filter element. The use of this conduit allows a relatively high pressure differential to build up across the filter elements and the layer of filter media in the pre-coat filtration vessel.

In another embodiment of the present invention, a filtration vessel having a plurality of filter elements is provided. Fluid to be filtered enters the filtration vessel, and exits via the filter elements. The filter media is mixed with the contaminated fluid and is delivered, under pressure, into the filtration vessel.

The filter media, which is selected depending on the desired utilization of the filtrate, and on the contaminants it is to filter, forms a "cake" on the exterior surface of the conduit, and it is this "cake" which filters the contaminants from the fluids. The filter media can comprise, for example, diatomaceous earth, powdered coal, saw dust and the like. Selection of a particular filter media also depends on the intended method of disposal of the filter media after it has been used to such extent that its contined used is impractical due to its inability to filter any more of the contaminants from the fluid. It should be noted that, even though some of the embodiments of the present invention provide for a filter system with a reusable filter media, there are times when disposal of the filter media is more practical. In such circumstances, the use of a combustible media has its advantages, since the dried filter media can be disposed of by burning without the necessity of transporting it to a special disposal site.

The filter media comprises filter particles which are sized such that they cannot pass through the filter elements. Enough filter particles are mixed with the fluid such that a sufficiently thick layer of filter media (known as "precoat" or "cake") is built up on the filter elements. During this period of precoating the filter element, the fluid exiting through the filter elements may simply be discharged, or may be recirculated through the system. Once the filter cakes have formed on the filter elements, a filtration cycle begins.

The contaminants are prevented from penetrating the filter elements by the precoat formed on the outside of it, so that only filtrate can enter the filter element conduit and be transported outside the system.

The contaminants trapped by the filter media allow less and less of the filtrate to penetrate inside the filter element, so that the pressure differential across the filter elements and layers of filter media substantially increases. Once the pressure differential reaches a predetermined value, the filtration cycle is interrupted to allow removal of the contaminants from the vessel.

Depending upon the make-up of the filter media, various steps may now be taken. If, for example, the filter media comprises filter particles which have a higher density than the fluid, the contaminant has a lower density than the fluid, and the contaminant does not unduly clog pores in the filter particles, the fluid flow into the vessel is stopped. This allows the filter particles to fall from the filter elements, and settle to the bottom of the filtration vessel. As the filter particles settle to the bottom of the filtration vessel, the contaminants which have been filtered out of the fluid, being less dense than the filter media, float above the filter particles. If necessary, the filter particles which have settled to the bottom of the vessel may be sparged to further separate the filter particles and the contaminants. A valve above the level of the filter particles may then be opened, decanting the fluid and the contaminants from the filtration vessel. Air or other gas can be used to speed up the flow of the fluid and contaminants out of the vessel. Now essentially free from contaminants, the filter particles may be used again to form a filter cake on the filter elements. The filtration cycle may then begin again.

If the filtration vessel is being used, for example, to filter contaminants which saturate the filter media such that reuse of the particles is impractical or impossible, the cleaning of the filtration vessel would be effected in the following manner. Fluid flow into the filtration vessel is stopped while air or some other gas is injected into the filtration vessel under pressure, forcing fluid to flow out of a valve near the bottom of the vessel and out of the filter elements. Once all of the fluid is out of the vessel and the filter cake is dry, the flow of gas into the filtration vessel is stopped. Pressurized gas is then directed into the vessel through the filter elements. The dry cake then to falls to the bottom of the vessel, and is then discharged out of the vessel through a dump valve on the bottom of the vessel. This dry cake discharge may be used whenever it is not desirable or not feasible to reuse the filter media. The dry cake discharge method allows for easy disposal of the spent filter media. The process then begins with new filter media being added to the fluid as the filtration vessel is filled.

If reuse of the filter particles is not desired or possible, and drying of the particles not necessary, the filtration vessel would be cleaned in accordance with a method known as "wet cake discharge". The fluid flow into the vessel is stopped. A valve in the bottom of the vessel is opened, allowing the fluid, filter particles, and accumulated contaminants to exit the filtration vessel. Another filtration cycle begins with the addition of a new filter media to fluid to be filtered.

When a filtration vessel is used to filter different products at different times, it is generally desirable to remove the "heel" ("heel" refers to the unfiltered fluid which is present in the filtration vessel at the time that flow of fluid into the filtration vessel is stopped) as filtrate. In such a case, the filter elements will extend substantially to the bottom of the filtration vessel, and would comprise an inner flow tube coaxially disposed with the filter element. The inner flow tube extends almost to the bottom of the filter element. When fluid flow into the vessel stops, pressurized gas is allowed to enter the vessel and forces the heel out of filtrate via the filter element, then through the inner flow tube, such that substantially all of the fluid exits the vessel as filtrate.

It is an object of the present invention to provide a filter aid filtration vessel which can withstand a high pressure differential across the filter element and the layer of filter media while providing high quality filtrate.

Providing a filter aid filtration vessel having a filter element which is easy to clean in another object of the present invention.

A further object of the present invention is to provide a process which allows filter media to be used more than once in a filter aid filtration vessel to provide a layer on a filter element.

It is also an object of the present invention to provide a process and apparatus for drying filter media which has been used in a filter aid filtration vessel in order to facilitate the disposal thereof.

Yet another object of the present invention is to provide a process and apparatus for allowing the heel in a filter aid filtration vessel to exit the filter aid filtration vessel as filtrate.

BRIEF DESCRIPTION OF THE DRAWINGS

For a further understanding of the nature and objects of the present invention, reference should be had to the following detailed description, taken in conjunction with the accompanying drawings in which like parts are given like reference numerals and wherein.

DETAILED DESCRIPTION OF THE PREFERRED EMBODIMENTS

The process and apparatus of the present invention have utility in a number of applications, and will presently be described in a system which provides a continuous supply of filtrate.

Figure 1:
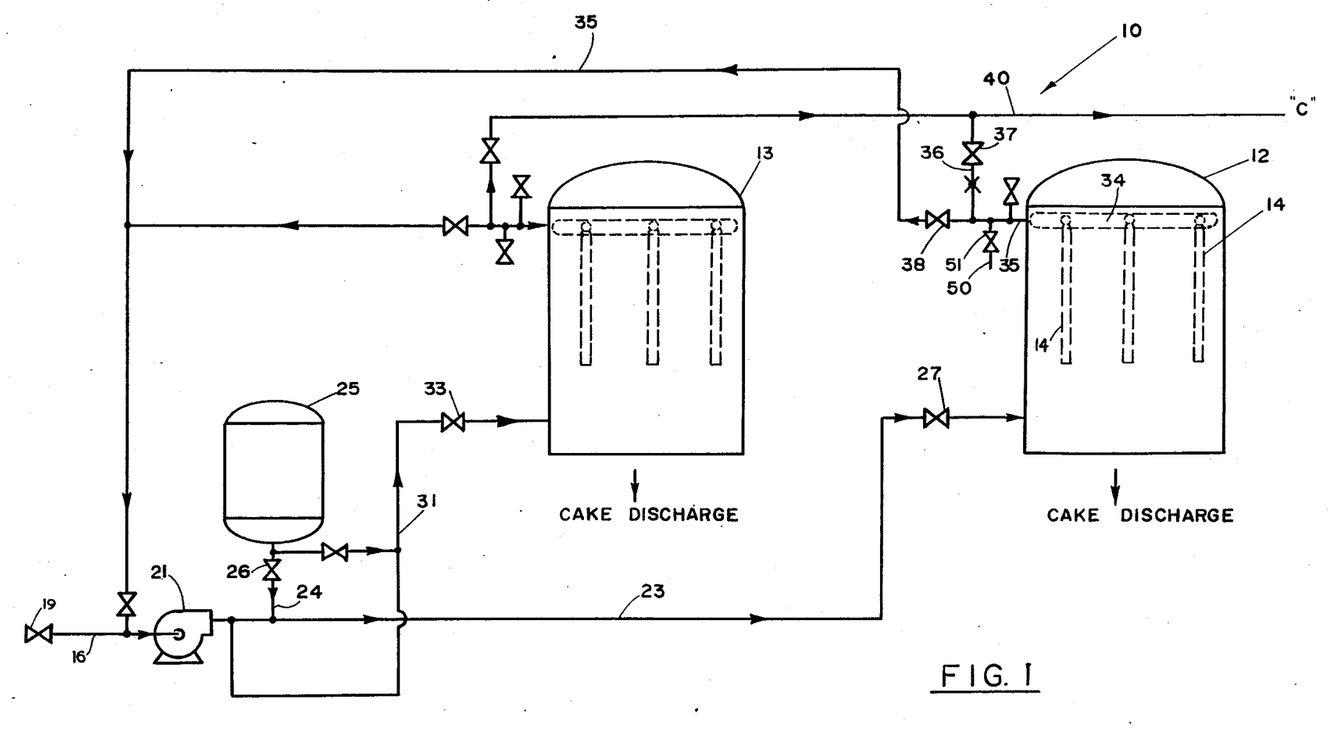
FIG. 1 is a schematic view of one embodiment of a system of the present invention.

A continuous filtrate supply system 10, illustrated in FIG. 1, includes a principal feed line 16 for feeding contaminated fluid into the system and filtration vessels 12 and 13. The feed line 16 is connected to a feed pump 21 which moves the fluid under pressure through line 23. Feed valve 27 is opened to allow the fluid to be introduced into the filtration vessel 12. A filter media is introduced into line 23 by induction from tank 25 through line 24 when valve 26, which is installed in the line 24, is opened. The filter media, or precoat slurry, comprises filter particles in a slurry form.

As further illustated in FIG. 1, feed line 23 feeds into the second filtration vessel 13 through branch line 31. There is a valve 33 located in line 31 to selectively allow or prevent flow of fluid through line 31 into the filtration vessel 13.

In the general operation of the system, only a single filtration vessel (for example, 13) would in a cleaning mode be at any given time, while the second filtration vessel (12) would be operating.

A filtration cycle starts with the feed line 16 carrying fluid and feeding the fluid via line 23 through pump 21 through open valve 27 into the filtration vessel 12. In the initial feed, valve 26 in line 24 is in the open position allowing the pre-coat slurry to enter line 23 and mix with the fluid in line 23. Once the correct volume of pre-coat slurry (i.e., when there is enough filter media to form a sufficiently thick layer of filter media on the filter elements) has entered line 23, valve 26 and line 24 is closed. While the "cake" is being built on the filter elements, the fluid entering the vessel is allowed to recirculate via line 35. Once there is a sufficient layer of caked filter media on each element, valve 38 is closed, preventing the fluid from recirculating via line 35 back into pump 21. Valve 37 is then opened, and filtrate now exits via line 40 to be collected at point "C"; the filtration process has now begun.

The filtration process continues in the filtration vessel 12 until such time as the pressure difference between the feed line 23 and the exit line 40 (i.e. pressure differential across the filter elements and filter media cakes), reaches a predetermined value, due to the accumulation of contaminants on the filter media cakes on the filter elements 14; the fluid would then be filtered through the filtration vessel 13.

Various factors determine the type of filtration vessel to use as well as the method of recharging the filtration vessel. These factors include whether or not it is desirable to reuse the filter media and, if it is not, the desired method to dispose of the waste filter media.

Figure 2:
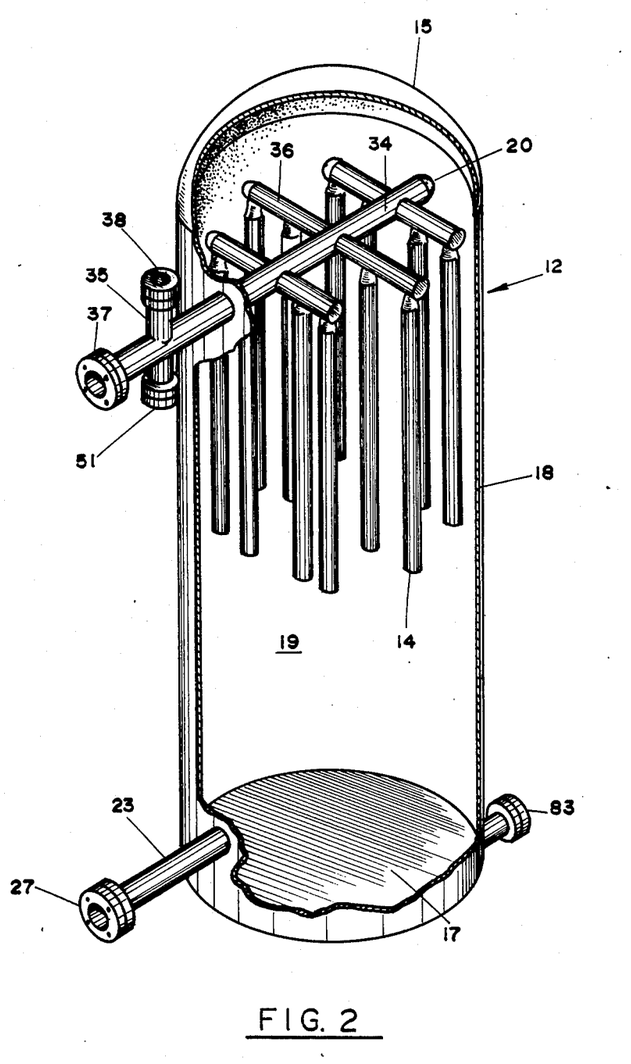
FIG. 2 is a perspective, partially cut-away view of one embodiment of a filtration vessel in accordance with the present invention.

If reuse of the filter media is not desirable, and drying of the filter media before disposal thereof is not necessary, a filtration vessel such as the one illustrated in FIG. 2 may be used in the system.

Referring to FIG. 2, vessel 12 comprises a generally vertically upright tank having a continuous annular side wall 18, a dome top portion 15 and a bottom portion 17, the top, bottom and side wall defining a filtration space 19 therewithin. Filtration vessel 13 has fluid inlet line 23 and fluid outlet line 35 protruding therefrom. Further contained within vessel 12 is filtration manifold system 20 which comprises central manifold 34 and manifold lines 36 teeing therefrom, each of the manifolds having filter elements 14 attached thereto, so that filter elements 14 project into filtration space 19, with the interior of each of the filter elements 14 in fluid communication with the manifold line 34 and fluid exit line 35.

Valves 27 and 37 are closed, interrupting fluid flow through filtration vessel 12. Valve 83 is opened, allowing the fluid, filter media, and accumulated contaminants to exit the vessel. Pressurized gas may be forced through filter elements 14 via valve 51, manifold 34 and manifold lines 36 to dislodge any filter media which may be attached to the filter elements. The pressurized gas also serves to speed up the exit of the fluid, filter media, and contaminants from the vessel. A new cycle may then begin.

Applicants have found that it is advantageous to use a conduit, having a relatively smooth exterior surface and high resistance to deformation of the opening or slot size, as filter element 14, in the vessel illustrated in FIG. 2.

Figure 7:
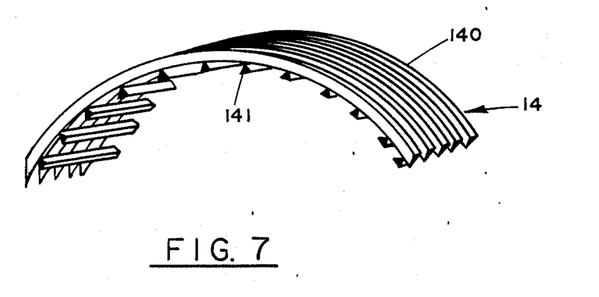
FIGS. 7 and 8 are perspective partial views of different embodiments of the filter element in accordance with the present invention.

Such a filter element is shown in FIG. 7. This filter element is somewhat similar to the one disclosed in U.S.

Pat. No. 4,096,911. The filter element 14 shown in FIG. 6 comprises a wedge wire 140 wound in a helical fashion to form a hollow conduit. The slot size between coils is selected to prevent leakage of the filter media therethrough, and is maintained by means of a plurality of parallel, axially oriented bracing rods 141 which are disposed on the interior of the conduit and are attached to the wedge wire on the inside of the conduit.

The wedge wire 140 is triangular in cross section, and the base of the triangle forms an outside surface of the filter element, so that the space between the layers of wire on the outside of the filter element is smaller than that on the inside of the filter element. This design facilitates cleaning of the filter elements, as the velocity of the pressurized gas increases as it passes through the wall of the conduit, effectively blowing out any filter media which may be attached to the filter element. This conduit is quite resistant to deformation of the opening size, and allows a high pressure differential to build up across the filter element and the layer of filter media without impairing the quality of the filtrate. In addition to overcoming the disadvantage of typical cloth and screen filter elements, which limit the pressure differential which can be built up across the filter elements due to their inability to maintain the opening size thereof, filter media does not become entrapped in the filter element, as in the case with filter elements employing windings of strands of material. Rather, the filter media may easily be removed from the filter elements when desired. The ability of the filter element to withstand large pressure differentials allows filtration to continue in the filtration vessel longer periods of time between cleaning of the filter element. The fact that the exterior surface of the filter element is relatively smooth and that the filter element does not trap filter media therein means that the filter element can be cleaned quickly. These two factors combine to provide a filtration vessel which has a high ratio of operational time to maintenance time.

Figure 8:
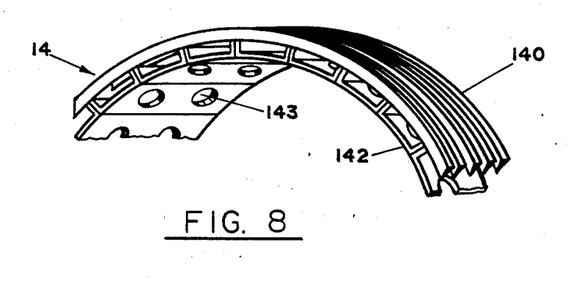

Another embodiment of the filter element 14 which can be used in the vessel illustrated in FIG. 2 is shown in FIG. 8. In this embodiment, the rods 141 of the filter element ilustrated in FIG. 7 are replaced with channel rods 142 having flow holes 143 therein.

Figure 3:
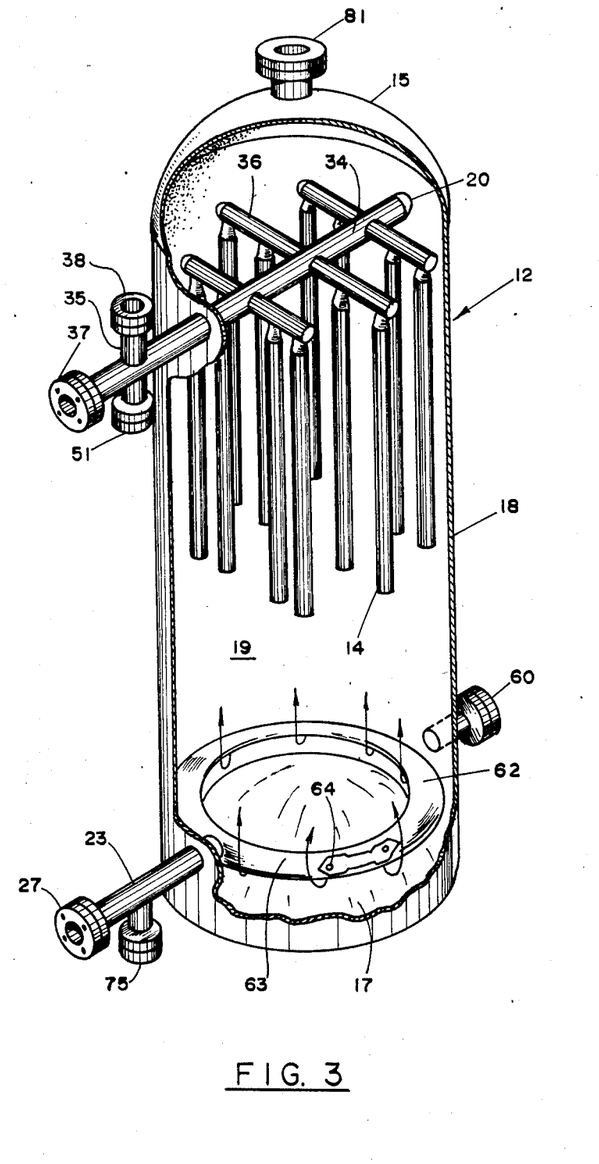
FIG. 3 is a perspective, partially cut-away view of another embodiment of a filtration vessel of the present invention.
Figure 4:
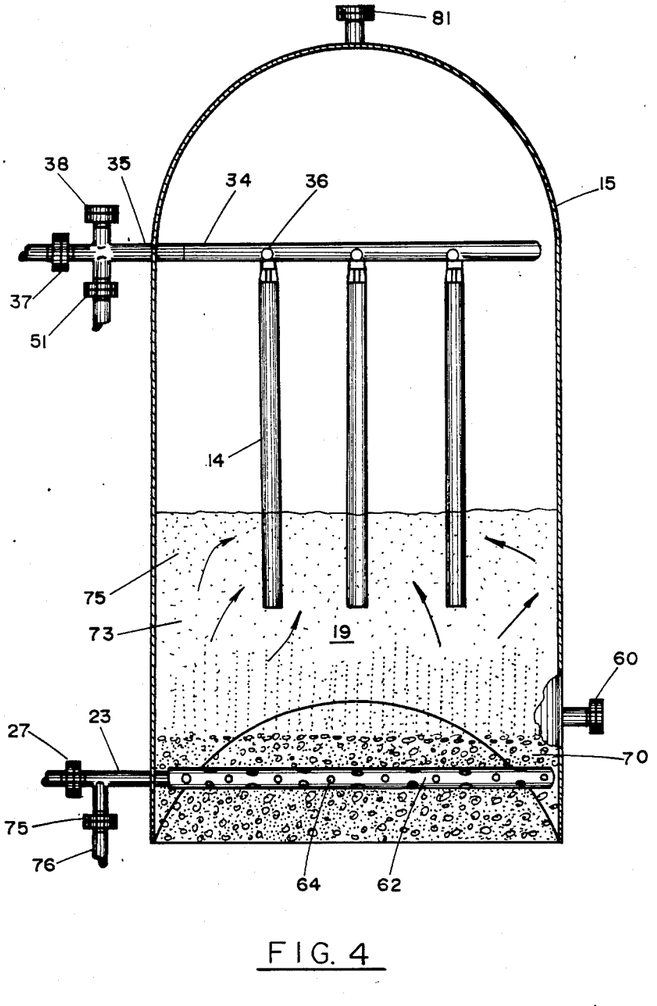
FIG. 4 is a schematic side view of the filtration vessel illustrated in FIG. 3.

In a situation where the contaminants have a lower density than the fluid in which they are suspended, which in turn has a lower density than the filter particles, and the contaminants do not unduly clog pores in the filter particles, the filter particles may be reused (such a situation may be encountered when filtering organisms out of seawater using filter particles comprising diatomaceous earth). In such as case, the filtration vessel 12 such as shown in FIGS. 3 and 4 is used; the method of recharging the filtration vessel will be described shortly. The filtration vessel shown in FIGS. 3 and 4 is similar to that illustrated in FIG. 2; it has, however, some different features. There is a valve 81 in the top portion of the vessel, and a valve 60 near the bottom of the vessel, the function of these valves will be described further. The floor 17 is in the shape of a dome. Also, in the lower portion of filtration vessel 12, there are agitation means 62 which comprise a continuous line 63 having a plurality of ports 64 disposed in the bottom thereof, line 63 being in fluid communication with line 23. Agitation means 62 are preferably located adjacent convex dome floor 17.

Fluid flow through filtration vessel 12 is interrupted by closing valve 27 and valve 37. In some cases, once the fluid flow through valve 27 has stopped, the filter media will settle to the bottom of the filtration space 19 in filtration vessel 12 as sediment 70 (see FIG. 4). Simultaneously, contaminant particles which have been separated from the filtrate separate now from the filter media and rise above the settled filter media 70 (the contaminant particles are represented by dots 75 in FIG. 4). It may be necessary to introduce pressurized gas via line 35, manifold 34 and manifold lines 36, through filter elements 14, to dislodge any filter media which may remain attached thereto. The pressurized gas could then exit the vessel 12 through the valve 81 disposed in the top 15 of vessel 12. It may be necessary to sparge the sediment 70 to further separate the filter media from the contaminant particles. This may be achieved by forcing pressurized gas through valve 75 via line 76 into line 23, and then into agitation means 62 to exit via ports 64 in line 63. This creates a continuous turbulence within the fluid and the sediment 70. This agitation causes the filter media to further become separated from the contaminant particles. Valve 60 is then opened, decanting the fluid and contaminant particles out of vessel 12 for collection outside of the vessel. Following the decanting of most of the fluid and contaminants through valve 60, the filter media sediment layer 70 remains on the bottom of the vessel 12. At this point, valve 60 is closed, and valves 27 and 81 are opened. Fluid enters vessel 12 via ports 64 in line 63, and mixes with filter media. Fluid forces air out of the vessel through valve 81; then valve 81 is closed. The ports 64 direct the fluid downward into the vessel, ensuring that the fluid mixes well with the filter particles. The dome-shaped bottom 17 directs the flow of the fluid and the filter media upward. When the vessel is filled with fluid, valve 38 is opened again, and a filter media cake layer forms on each filter element 14. It may be necessary to add some slurry by opening valve 26 in line 24, as filter media is sometimes lost during decanting of the fluid and contaminant particles through valve 60. Once a sufficient layer of caked filter media has formed on each of the filter elements 14, valve 38 is closed and valve 37 is opened allowing the filtrate to flow through point "C", and the filtration vessel 12 is again ready to be used in the filtration process.

Although not shown, a plurality of decanting valves can be installed in the filtration vessel, depending on the level at which contaminants are to be decanted. This will depend on the relative density and amount of the contaminants. In cases where the contaminants which have been trapped by the filter media layer separate well enough from the fluid and a concentration consisting essentially of contamiants rises to the top of the vessel, a valve substantially at that level is opened to decant the contaminants, thereby saving the trouble and time associated with decanting all of the fluid.

This method of reusing filter media in the filtration vessel is particularly advantageous in that it is more economical than conventional methods. In addition to the fact that a given amount of fluid can be filtered using less filter media (hence less filter media needs to be acquired) the absence of waste filter media results in elimination of the inconvenience and costs associated with the disposal thereof.

Figure 5:
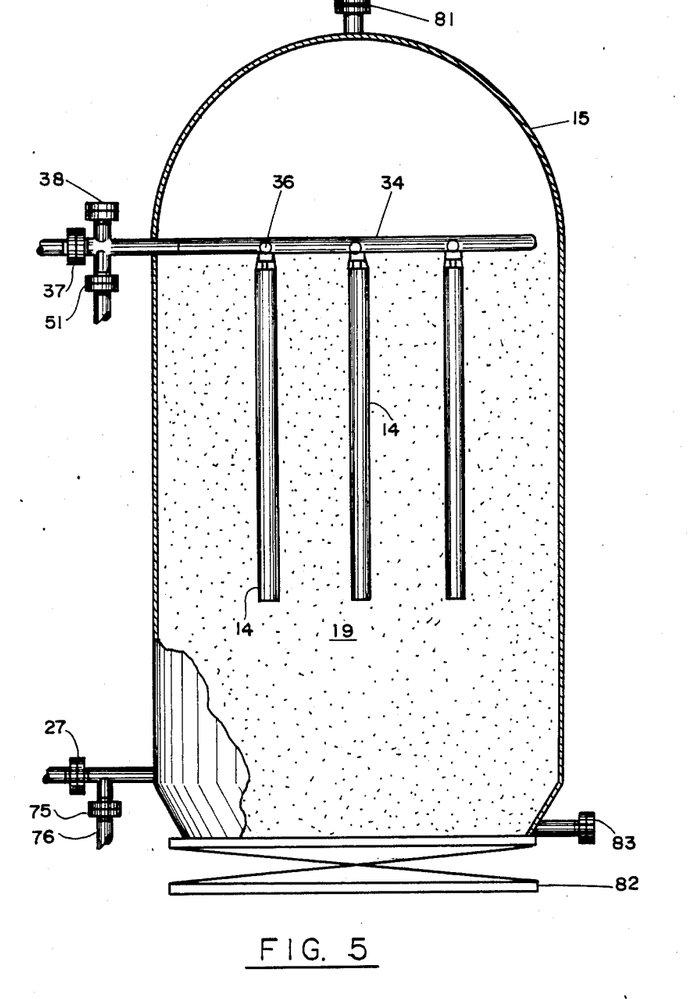
FIGS. 5 and 6 are schematic side views of other embodiments of a filtration vessel in accordance with the present invention.

When it is either not possible or not desirable to reuse the filter media, but drying of the filter media before discharging it from the filtration vessel is desirable, a filtration vessel such as shown in FIG. 5 is used in the system illustrated in FIG. 1. This filtration vessel is similar to that of FIGS. 3 and 4, the major difference being a full-open dump valve 82 replacing the convex dome bottom 17 of the vessel of FIGS. 3 and 4, and the absence of agitation means 62 (there is no sediment to be sparged or to be mixed with fluid). In this embodiment, when the pressure differential reaches a predetermined value, which indicates that the filter media cake is saturated with contaminants, valve 81, valve 51 and valve 83 are opened simultaneously as valve 27 and valve 37 are closed to prevent fluid flow through the filtration vessel 12. Pressurized gas enters through valve 81, forcing fluid out of valve 83 and out of filter elements 14 through manifold lines 36, manifold 34, and valve 51, drying the filter media cakes. Next, valve 83 and valve 81 are closed, dump valve 82 is opened and pressurized gas is forced through filter elements 14 via valve 51, manifold 34 and manifold lines 36, blowing the dried cake off of the filter elements 14. The dried cake exits filtration vessel 12 through dump valve 82.

The dried waste filter media is easier to dispose of than wet waste filter media. Waste filter media often needs to be transported to a location distant from the filtration vessel. The lack of fluid in the dry waste filter media makes it lighter and of a reduced volume and, therefore, more economical to transport than wet waste filter media.

The filtration vessel shown in FIG. 5 can be useful, for example, when filtering oil-contaminated water using filter media comprising saw dust, powdered coal and the like. Drying such oil-saturated filter media allows it to be disposed of later by burning.

When a more versatile filtration vessel is desired, a ball valve may be used as the dump valve 82 in the vessel illustrated in FIG. 5. Adding agitation means 62 and valve 60 would result in a filtration vessel combining essentially all of the features of the vessels shown in FIGS. 3 and 5 as, in the closed position, the ball valve would serve the same function as the dome-shaped bottom 17 of FIG. 3.

It is sometimes desirable, when processing food or chemical through filtration vessels, to save on equipment cost by using one filtration system to filter, at different times, a variety of fluid products. In such as case, it is desirable to process an entire batch of product before moving on to the next product. In order to do this, all fluid which enters the filtration vessel should exit as filtrate. When such a situation is encountered, a filtration vessel such as that illustrated in FIG. 6 can be advantageously used.

Figure 6:
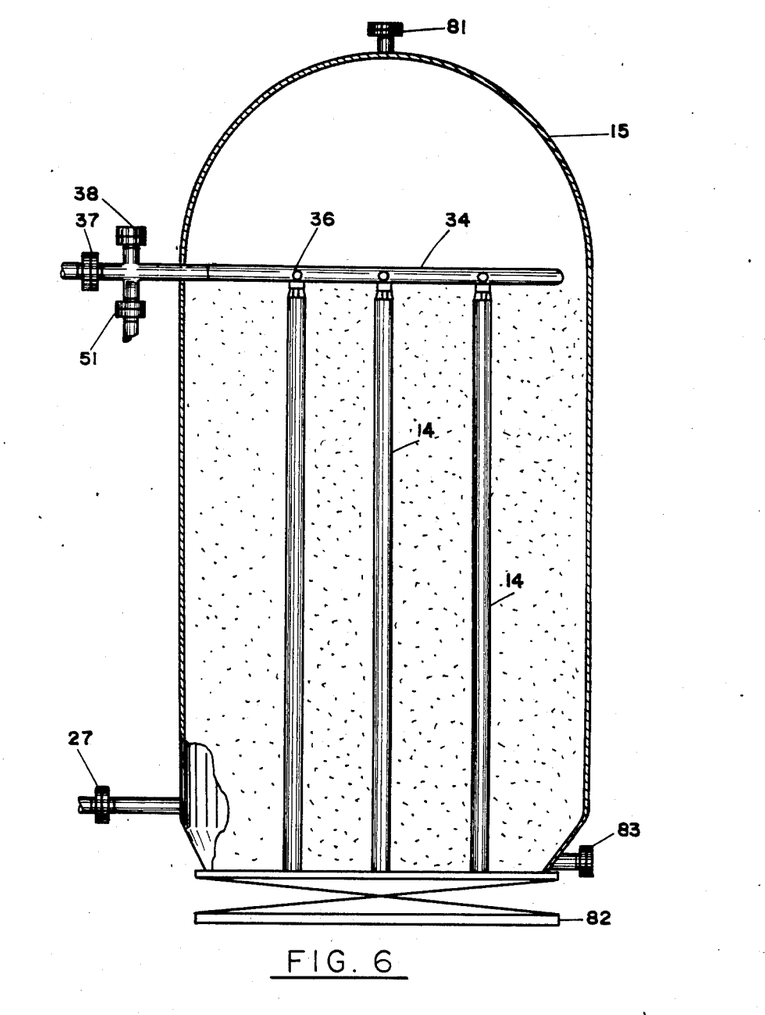
Figure 9:
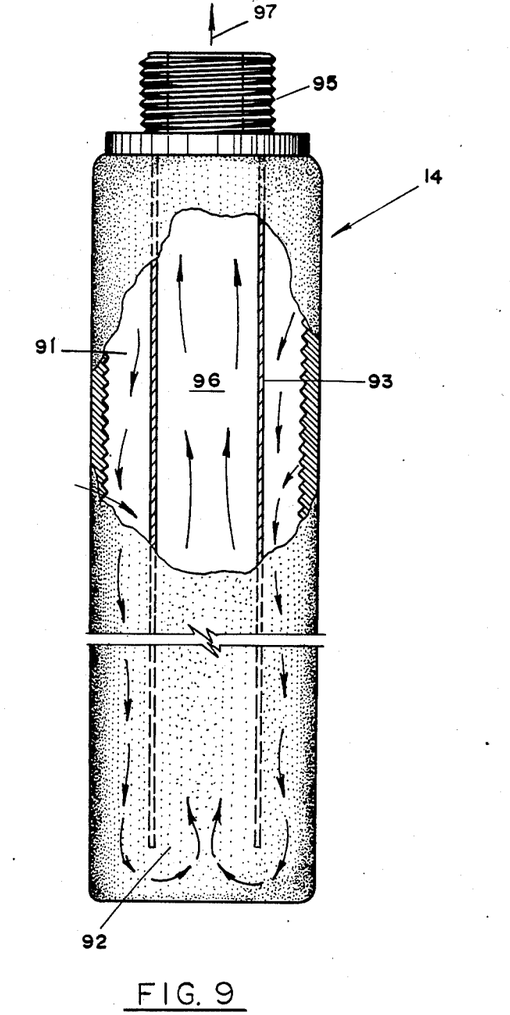
FIG. 9 is a partially cutaway view of another embodiment of the filter element in accordance with the present invention.

As can be seen in FIG. 5, the filter elements 14 extend to the bottom of the filtration vessel. The filter element used in conjunction with the apparatus shown in FIG. 6 is best seen in FIG. 9. The filter element comprises a continuous side wall which has openings to allow fluids to penetrate therethrough, a closed bottom and an open top. Threads 95 at the upper portion of the filter element allow attachment of it to manifold line 36. The outside surface of the continuous wall is adapted to accommodate particles of filter media introduced into the filtration vessel. The filter element further comprises an inner flow tube 93 coaxially mounted inside the main body of the filter element. The wall of this inner flow tube is non-perforated (solid) and extends downward substantially the entire length of the filter element, being open at the bottom and top. As can be seen in FIG. 9, the diameter of the inner flow tube is smaller than that of the main body of the filter element for 10; therefore, the walls of the filter element and the inner flow tube form an annular flow space 91 therebetween. The space inside of the inner flow tube, designated by numeral 96 in the drawings, fluidly communicates with the flow space 91 and manifold 34.

FIG. 9 also shows a precoat layer formed on the outside of the filter element of, for example, diatomaceous earth, which was introduced into the fluid for adherence to the exterior of the filter element 14.

In operation fluid introduced through valve 27 into the vessel flows through the filter layer into flow space 91 downward to the bottom of the filter element 14, which is spaced from the lowermost edge of the inner flow tube to allow the fluid, in the form of the filtrate, to pass therethrough. The filtrate further continues to flow upward, under pressure, through opening 92 into the inner flow space 96, and exits in the direction of arrow 97 into the manifold line 36.

Once the filter media becomes saturated with contaminants, the fluid flow into the vessel is stopped by closing valve 27.

Valve 81 is then opened, allowing pessurized gas to enter the filtration vessel. The pressurized gas forces the heel out of the filtration vessel. The central flow tube 93 serves to prevent the pressurized gas from exiting through the upper part of filter elements 14 directly into manifold lines 36; due to the presence of central flow tube 93, in order for the pressurized gas to exit vessel 12, it must first force the heel out of the vessel through filter element 14, via opening 92 through central flow tube 93. Since the pressurized gas maintains the pressure in the vessel 12, the layer of filter media remains in place during the emptying of the heel; therefore, the heel is filtered by the layer of filter media, and exits the vessel as filtrate. This filtrate (see FIG. 9) passes through annulus 91 down to lower opening 92 in central flow tube 93 of filter element 14. The filtrate then passes through the central flow tube 93 and through manifold lines 36, manifold 34, and valve 37. This flow of filtrate out of the vessel continues until the level of the fluid in filtration vessel 12 reaches the level of the opening in the bottom of central flow tube 93, at which time the pressurized gas can enter into the central flow tube 93 directly, and no longer forces fluid as filtrate out of the vessel. The flow of gas into the vessel is then stopped by closing valve 81, and the filter cake, which had been held onto the outside of the filter elements 14 by virtue of the pressurized gas, now falls to the bottom of the vessel. If necessary, pressurized gas can enter through valve 51, manifold 34, manifold lines 36 and through filter elements 14 to dislodge any filter cake which may remain attached thereto. The filter media may then be discharged from the vessel through dump valve 83 in the bottom of the vessel. Once the filter media has been discharged from the vessel, the vessel is ready to be prepared to filter another product. Proper filter media chosen in consideration of the type of product to be filtered is used to form a layer of filter media on the filter elements. The filtration vessel is then ready to filter another product.

Figure 10:
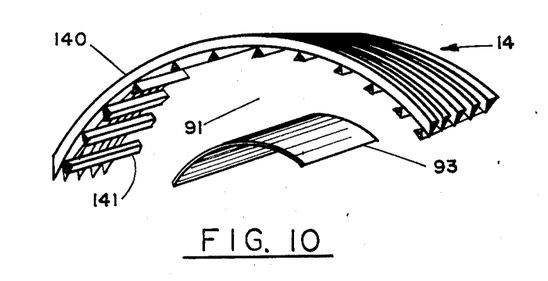
FIGS. 10 and 11 are perspective partial views of two embodiments of the filter element in accordance with the present invention.
Figure 11:
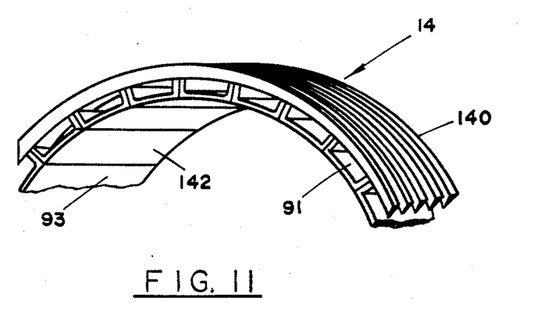

The filter element 14 used in the vessel shown in FIG. 6 may comprise any suitable conduit having a central flow tube; for example, it could comprise an outer conduit comprising a perforated tube having windings of strand material thereon and an inner conduit comprising a central flow tube. It is preferable, however, to use filter elements such as those illustrated in FIGS. 9 and 10. FIG. 10 shows a filter element comprising a conduit, similar to that illustrated in FIG. 7, and a central flow tube 93 disposed in the conduit and co-axial therewith. In the filter element illustrated in FIG. 11, the wall of the central flow tube 93 is formed by the surfaces of the channel rods 142 which are parallel to the outer surface of the helically wound wedge wire 140. These filter elements may be formed of any suitable material which is sufficient for a particular application, for example, stainless steel or plastic.

As was described in the background of the invention, one type of filter aid filtration method comprises forming a layer of filter cake on a filter element and a filtration vessel, and continually feeding filter media into the contaminated fluid from a slurry tank. This is done in order to prolong the time interval between cleaning of the filter elements in the filtration vessel by preventing the contaminants from forming a concentrated layer on the filter cake, which would quickly restrict flow of fluid through the layer of filter media. In cases where the ratio of filter media to contaminants is relatively high when the filter cakes have built up such that fluid flow through them is severely restricted, or when the adjacent filter cakes come into contact with each other, the filter media may be reused. The method of doing this would comprise emptying the filter media from the filtration vessel, and routing it back to the slurry tank. It may then be added to fluid to be filtered. Once the filter media becomes so full of contaminants that it can no longer be effectively used in the filter cake layer, it may be cleaned or disposed of in any manner described in this application. In some processes, the desired product is the "contaminants" rather than the filtrate. The present invention can also be used in the such cases; for example, if the desired product is lighter than the fluid in which it is suspended, a filter media having a higher density than the fluid may be utilized in the vessel illustrated in FIGS. 3 and 4. If this product separates well from the fluid and filter media when the fluid flow into the vessel has stopped, the product may be decanted into a holding vessel through a valve (not shown) located substantially adjacent the bottom level of the layer of the product.

There are times when neither the fluid nor the contaminants are considered "products", such as when a fluid is separated from suspended contaminants to facilitate the disposal of both the fluid and the contaminants. The present invention may also be used in such cases.

While not specifically shown, each of the filter elements 14 in each embodiment of the present invention has a cap on the lower end thereof to prevent fluid from bypassing the layer of filter media.

The filter element used in the embodiments of the invention illustrated in FIGS. 3, 4 and 5 may comprise any suitable conduit, but preferably comprises a conduit having a substantially smooth exterior surface and having sufficient resistance to deformation of the opening size therein, such as the filter element illustrated in FIGS. 7 and 8. The filter element may be constructed of any material suitable for a particular application, such as plastic or stainless steel.

Although the present invention has been described in a system utilizing two filtration vessels and a plurality of filter elements, it is to be understood that it would be possible to use any number of filter elements or filtration vessels, as need or desire may dictate; for example, when filling a storage tank with filtrate, it may be necessary to use only one filtration vessel, or to use a plurality of vessels, all being in a filtration mode at one time.

Many changes and modifications in the above described embodiments of the invention can be carried out without departing from the spirit or scope thereof. We therefore pray that our rights to the present invention be limited only by the following claims.

I claim:

1. A process of filtering a fluid, comprising the steps of:
   a. providing a filtration vessel having a filtration space;
   b. providing at least one filter element inside the filtration vessel, the filter element having an interior and an exterior side;
   c. providing a source of filter media;
   d. introducing filter media into the filtration vessel;
   e. providing means for delivering a contaminated fluid into the filtration vessel;
   f. introducing a flow of the contaminated fluid, having contaminants therein which are less dense than the fluid, into the filtration vessel, wherein the fluid is less dense than the filter media;
   g. providing means for removing filtrate from the interior of the filter element;
   h. forming a layer of filter media on the exterior side of the filter element;
   i. removing filtrate from the filtration vessel;
   j. interrupting the flow of fluid into the filtration vessel, thereby allowing the filter media to settle inside the filtration vessel and allowing contaminants, which have accumulated on the layer of the filter media, to rise above the settled filter media; and
   k. decanting substantially all contaminants from the filtration vessel.

2. The process of claim 1, further comprising the steps of:
   introducing a new flow of the contaminated fluid into the vessel;
   repeating steps h-k of claim 1, thereby reusing the filter media present in the filtration vessel.

3. The process of claim 1, wherein the filter media comprises diatomaceous earth.

4. A process as in claim 1, wherein the contaminated fluid is delivered, by pressure, into the vessel.

5. A process as in claim 1, wherein the filter media is carried into the vessel in the contaminated fluid.

6. The process of claim 1, wherein the filter element comprises a hollow conduit having an interior and a substantially smooth exterior surface.

7. The process of claim 6, wherein the conduit is formed by a wedge wire wound in a helical fashion with coils secured in helical relationship by axial braces securely attached to the wire on the interior of the conduit.

8. The process of claim 7, wherein the wire is triangular in cross-section, with the base of the triangle forming the exterior surface of the conduit.

9. The process of claim 1, further comprising the step of forcefully introducing gas through the filter element into the filtration vessel to facilitate removal of the filter media from the filter element.

10. The process of claim 1, further comprising the step of agitating the settled filter media to facilitate separation of the contaminants from the filter media.

11. A process as in claim 10, wherein pressurized gas is used to agitate the settled filter media.

12. A process of filtering a fluid and cleaning a filter element, comprising the steps of:

a. providing a filtration vessel having a filtration space;
b. providing at least one filter element inside the filtration vessel, the filter element having an interior and an exterior side;
c. providing a source of filter media;
d. introducing filter media into the filtration vessel;
e. providing means for delivering a contaminated fluid into the filtration vessel;
f. introducing a flow of the contaminated fluid into the filtration vessel;
g. providing means for removing filtrate from the interior of the filter element;
h. forming a layer of filter media on the exterior side of the filter element;
i. removing filtrate from the filtration vessel;
j. interrupting the flow of fluid into the filtration vessel;
k. introducing pressurized gas into the vessel, forcing fluid out of the vessel and forcing fluid through the filter element, thereby emptying the vessel of fluid and drying out the layer of filter media;
l. interrupting the flow of pressurized gas into the vessel, allowing the filter particles to fall from the filter elements;
m. forcing pressurized gas through the filter element to dislodge any filter media which may remain attached thereto;
n. discharging the filter media from the filtration vessel; and
wherein the filter element comprises a hollow conduit having an interior and a substantially smooth exterior surface, with the conduit being formed by a wedge wire wound in a helical fashion with coils secured in helical relationship held by axial braces securely attached to the wire on the interior of the conduit.

13. The process of claim 12, wherein the wire is triangular in cross-section, with the base of the triangle forming the exterior surface of the conduit.

14. An apparatus for filtering contaminated fluids, comprising:
a vessel having a filtration space therein;
means for introducing a contaminated fluid into the vessel;
means for introducing filter media into the vessel;
at least one filter element, having an inside and an outside, inside the vessel, the filter element comprising a hollow conduit having an interior and an exterior surface, with the conduit being formed by a wedge wire wound in a helical fashion with coils being secured in helical relationship by axial braces securely attached to the wire on the interior of the conduit;
means for forming a layer of filter media on the outside of the filter element;
means for removing filtrate from the inside of the filter element; and
decanting means for decanting contaminants from the vessel without the filter media from the vessel.

15. The apparatus of claim 14, wherein the wire is triangular in cross-section with the base of the triangle forming the exterior surface of the conduit.

16. The apparatus of claim 14, wherein the vessel has a bottom portion which is convex, and the agitation means comprise a continuous conduit having a plurality of ports, the conduit being installed adjacent the bottom portion of the vessel.

17. Apparatus for filtering contaminated fluids using fiter aid filtration methods, comprising:
a vessel having a filtration space;
means for introducing a fluid into the vessel;
means for introducing filter media into the vessel;
at least one filter element in the vessel;
means for forming a layer of filter media on the filter element;
means for removing filtrate from inside of the filter element;
wherein the filter element comprises a hollow conduit having an interior and an exterior surface, the conduit being formed by a wedge wire wound in a helical fashion with coils being secured in helical relationship by axial braces securely attached to the wire on the interior of the conduit.

18. The apparatus of claim 17, wherein the wire is triangular in cross-section, with the base of the triangle forming the exterior surface of the conduit.

19. The apparatus of claim 17, wherein the filter media comprises diatomaceous earth.

20. An apparatus for filtering a fluid, comprising:
a vessel having a filtration space therein;
means for delivering a contaminated fluid into the vessel;
means for introducing filter media into the vessel;
at least one filter element in the vessel in fluid communication with the filtration space, with the filter element comprising a hollow conduit having an interior and a substantially smooth exterior surface, with the conduit being formed by a wedge wire wound in a helical fashion with coils being secured in helical relationship by axial braces securely attached to the wire on the interior of the conduit;
means for removing filtrate from inside of the filter element;
means for introducing pressurized gas into the vessel to facilitate removal of substantially all fluid from the vessel and to facilitate drying of the filter media;
means to allow pressurized gas to enter the filtration vessel through the filter element to facilitate removal of the filter media from the filter element; and
means for removing the filter media from the vessel for subsequent disposal thereof.

21. The process of claim 20, wherein the wire forming the conduit is triangular in cross-section, with the base of the triangle forming the exterior surface of the conduit.

22. A process of filtering a contaminated fluid, comprising the steps of:
a. providing a filtration vessel, having a filtration space;
b. providing a source of a filter media;
c. providing means for delivering the contaminated fluid, under pressure, into the filtration vessel;
d. introducing a flow of the contaminated fluid and the filter media into the filtration vessel;
e. providing at least one filter element inside the filtration vessel, the filter element having an interior and an exterior;
f. providing means for removing a filtrate, under pressure, from the interior of the filter element;
g. creating a pressure differential between the filtration space and the interior of the filter element by forming a layer of filter media on the exterior of the filter element while allowing the filtrate to enter the interior of the filter element;

h. removing the filtrate from the filtration vessel;

i. interrupting the flow of fluid inside into and outside from the filtration vessel, thereby allowing the filter media to settle, under gravity, inside the filtration vessel and allowing contaminants, which have accumulated on the layer of the filter media, to rise above the settled filter media; and j. decanting substantially all contaminants from the filtration vessel.

23. The process of claim 22, further comprising the steps of:

introducing a new flow of the contaminated fluid into the vessel;

repeating steps g–j of claim 22, thereby reusing the filter media present in the filtration vessel.

24. The process of claim 22, wherein the filter media comprises diatomaceous earth.

25. The process of claim 22, wherein the filter element comprises a hollow conduit having an interior and an exterior, the conduit being formed by a wedge wire wound in a helical fashion with coils being secured in helical relationship by axial braces securedly attached the wire on the interior of the conduit.

26. The process of claim 25, wherein the wire is triangular in cross-section, with the base of the triangle forming the exterior of the conduit.

27. The process of claim 22, further comprising the step of forceful introduction of gas into the filtration vessel to facilitate removal of the contaminants and drying of the filter media.

28. The process of claim 27, further comprising the step of removal of the filter media, which has been dried, from the filtration vessel for subsequent disposal.

29. The process of claim 22, further comprising the step of agitating the settled filter media to facilitate separation of the contaminants from the filter media.

30. A process of filtering a contaminated fluid, comprising the steps of:

a. providing a filtration vessel having a filtration space therein;

b. providing a source of a filter media;

c. providing means for delivering the contaminated fluid, under pressure, into the filtration vessel;

d. introducing a flow of contaminated fluid and the filter media into the filtration vessel;

e. providing at least one filter element inside the filtration vessel, the filter element having an interior and an exterior, the filter element being formed by a wedge wire wound in a helical fashion with coils being secured in the helical relationship by axial braces securedly attached to the wire on the interior of the filter element;

f. providing means for removing a filtrate from the interior of the filter element;

g. creating a pressure differential between the filtration space and the interior of the filter element by forming a layer of filter media on the exterior of the filter element while allowing the filtrate to enter the interior of the filter element;

h. removing the filtrate from the filtration vessel;

i. interrupting the flow of fluid inside into and outside from the filtration vessel, thereby allowing the filter media to settle, under gravity, inside the filtration vessel and allowing contaminants, which have accumulated on the layer of the filter media, to rise above the settled filter media;

j. forcefully introducing gas into the filtration vessel to facilitate agitation of the settled filter media to further separate contaminants from the filter media;

k. decanting substantially all fluid and contaminants from the filtration vessel;

l. introducing a new flow of the contaminated fluid into the vessel; and m. repeating steps g–j, thereby reusing the filter media delivered to the filtration vessel.

31. A process of filtering a contaminated fluid, comprising the steps of:

a. providing a filtration vessel having a filtration space therein;

b. providing a source of a filter media;

c. providing means for delivering the contaminated fluid, under pressure, into the filtration vessel;

d. introducing a flow of contaminated fluid and the filter media into the filtration vessel;

e. providing at least one filter element inside the filtration vessel, the filter element having an interior and an exterior, the filter element being formed by a wedge wire wound in a helical fashion with coils being secured in the helical relationship by axial braces securedly attached to the wire on the interior of the filter element;

f. providing means for removing a filtrate from the interior of the filter element;

g. creating a pressure differential between the filtration space and the interior of the filter element by forming a layer of filter media on the exterior of the filter element while allowing the fitrate to enter the interior of the filter element;

h. removing the filtrate from the filtration vessel;

i. providing means for removing the fluid present in the filtration vessel outside the vessel;

j. interrupting the flow of fluid into the vessel, k. introducing pressurized gas into the vessel, thereby facilitating removal of the fluid present in the filtration vessel through the means of removing the fluid and facilitating drying of the filters media; and l. removing the dried filter media from the filtration vessel.

32. The process of claim 31, further comprising the step of introducing pressurized air through the interior of the filter element, thereby assisting in drying of the filter media.

33. An apparatus for filtering contaminated fluids, comprising:

a vessel having side walls and closed top and bottom, defining a filtration space therewithin;

a feed line for delivering a contaminated fluid, under pressure, inside the vessel;

means for introducing a filter media into the vessel;

at least one filter element mounted inside the vessel, wherein the filter element comprises a hollow conduit having an interior and an exterior, the conduit being formed by a wedge wire wound in a helical fashion with coils secured in helical relationship by axial braces securedly attached to the wire on the interior of the conduit;

an outlet line for removing a filtrate from inside of the filter element;

means for selectively creating a pressure differential between the filtration space and the inside of the filter element by allowing the filter media to settle on an outside of the filter element and by allowing the contaminants, suspended in the fluid, to attach themselves to filter media particles;

agitation means for agitating the filter media which settles on the bottom of the vessel after the pressure differential is eliminated; and means for decanting the contaminants from the vessel without removing the filter media.

34. The apparatus of claim 33, wherein the bottom portion of the vessel is convex, and the agitation means comprises a continuous conduit having a plurality of ports, the conduit being installed adjacent the bottom portion of the vessel.

35. The apparatus of claim 33, wherein the filter media is diatomaceous earth.

36. The apparatus of claim 33, wherein the filter media is a combustible media.

37. The apparatus of claim 36, wherein the combustible media is powdered coal.

* * * * *